United States Patent [19]

Mansmann et al.

[11] 3,907,954

[45] Sept. 23, 1975

[54] PRODUCTION OF FIBERS CONTAINING SILICON-OXYGEN BONDS

[75] Inventors: Manfred Mansmann; Gerhard Winter, both of Krefeld, Germany

[73] Assignee: Bayer Aktiengesellschaft, Leverkusen, Germany

[22] Filed: Feb. 8, 1972

[21] Appl. No.: 224,584

[30] Foreign Application Priority Data

Feb. 12, 1971  Germany............................ 2106728
Nov. 26, 1971  Germany............................ 2158582

[52] U.S. Cl. ............. 264/63; 264/DIG. 19; 264/56; 264/204
[51] Int. Cl.² ..................... D02G 3/00; C04B 35/64
[58] Field of Search ........... 264/63, DIG. 29, 176 F, 264/204, 347, 56; 260/33.2 SB, 29.2 N

[56] References Cited

UNITED STATES PATENTS

| 2,886,404 | 5/1959 | Teja .............................. 264/DIG. 19 |
| 2,908,545 | 10/1959 | Teja .............................. 264/DIG. 19 |
| 3,159,496 | 12/1964 | Rossng ........................... 260/29.2 N |
| 3,313,739 | 4/1967 | Acker ............................. 252/451 |
| 3,395,117 | 7/1968 | Burzynski et al. .................. 252/451 |
| 3,428,719 | 2/1969 | Robertson ........................ 264/DIG. 19 |
| 3,485,904 | 12/1969 | Osfrowski ....................... 264/56 |
| 3,503,765 | 3/1970 | Blaze, Jr. ....................... 264/DIG. 19 |
| 3,565,749 | 2/1971 | Wizon ........................... 264/DIG. 19 |
| 3,652,749 | 3/1972 | Sobel et al. ..................... 264/DIG. 19 |
| 3,678,144 | 7/1972 | Shoup ............................ 264/63 |
| 3,781,400 | 12/1973 | Couchoud et al. ................. 264/210 F |
| 3,821,070 | 6/1974 | Mansmann et al. ................. 161/172 |

*Primary Examiner*—Jay H. Woo
*Attorney, Agent, or Firm*—Burgess, Dinklage & Sprung

[57] ABSTRACT

Silicone fibers are produced by dry or wet spinning a solution obtained by hydrolysis of an organoalkoxysilane and/or an organoalkoxypolysiloxane, which solution also contains about 0.01 to 2% of highly polymerized poly-lower alkylene oxide, by incorporating therein a tetraalkoxysilane and/or an alkoxypolysiloxane to the extent of about 5 to 99 mole % of the silanes plus siloxanes. The spinning solution may be formed directly from reaction of the corresponding chlorosilanes with lower alkanols, removal of by-product HCl, and addition of poly-lower alkylene oxide and of water in up to about six times the stoichiometric amount required for complete hydrolysis of all the alkoxy groups of the silanes and siloxanes. If desired, up to 40% of a lower alkanol can be added to the solution as a solubilizing agent. The resulting novel silicone fibers can be converted to quartz fibers by heating above 600°C, and if heating is effected rapidly and/or under an inert gas varying amounts of carbon in finely disperse form will be distributed through the fiber.

10 Claims, No Drawings

PRODUCTION OF FIBERS CONTAINING SILICON-OXYGEN BONDS

The present invention relates to fibers containing silicon-oxygen bonds, i.e., silicone and quartz fibers, and to their production.

By silicon dioxide fibers there are to be understood, within the framework of the present invention, fibers which apart from silicon have only a negligible content of metal ions, e.g. less than about 1% by weight. They can, however, additionally contain carbon or groups containing carbon, i.e., organic groups which are attached to silicon by a direct carbon-silicon bond and by a carbon-oxygen-silicon bond.

Two different types of commercial $SiO_2$ fibers are recognized: first, those which are manufactured by spinning an $SiO_2$ melt, and second, fibers which are freed of the foreign cations by acid leaching of silicate glass fibers, for example the well-known A- or E-glass fibers or special alkali silicate fibers. $SiO_2$ fibers manufactured by melt spinning, by virtue of their substantially better mechanical properties as compared to leached fibers, are suitable for use as extremely heat-resistant reinforcing fibers for the field of fiber laminates which in recent years has constantly grown in importance. Admittedly, melt spinning requires temperatures of 2,000° – 2,100°C, with all the technical difficulties, and difficulties with regard to constructional materials, associated with such high temperatures.

Whereas by producing silicate glass fibers the temperature during the spinning process can be greatly reduced, an involved leaching process becomes necessary, resulting in a mechanically weak and porous $SiO_2$ fiber. With shorter leaching times, the fiber still contains relatively high proportions of cations which restrict the usability of the fiber at higher temperatures, as compared to the purer $SiO_2$ fibers. Leached $SiO_2$ fibers have in particular found use as a heat insulating material.

It has become customary in the literature to describe the $SiO_2$ fibers manufactured from the melt as quartz fibers though in fact they consist of quartz glass and not of the crystalline quartz modification. The $SiO_2$ fibers manufactured by the leaching process are also known as silica fibers.

According to an earlier proposal of this company, a third group of $SiO_2$ fibers, hereafter described as silica gel fibers, can be manufactured by spinning a solution of a hydrolyzed tetraalkoxysilane or of a hydrolyzed alkoxypolysiloxane into fibers in the presence of dissolved high molecular polyethylene oxide. By heating in air up to 800°C or above, the silica gel fibers are converted into quartz glass fibers, the properties of which do not differ from those of commercial quartz fibers.

The attempts to transfer this principle of manufacture to compounds of the general formula

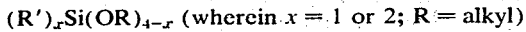
$(R')_xSi(OR)_{4-x}$ (wherein $x = 1$ or $2$; $R = $ alkyl)

in order, for example, to manufacture methylpolysiloxane fibers from methyltriethoxysilane or dimethyldiethoxysilane and, if desired, to manufacture quartz glass fibers from the above fibers by heating, were unsuccessful. Either entirely sticky fibers were obtained, which it was not possible to dry even at higher temperatures, or the spinning solution separated into an aqueous part containing the polyethylene oxide and a polysiloxane part.

It is accordingly an object of the invention to produce a silicone fiber and to produce quartz fibers therefrom.

In accordance with the present invention it has now been found that silicone fibers can be produced by conventional fiber-forming techniques without the problems hereinabove noted if in a solution of a hydrolyzed organoalkoxysilane or an organoalkoxypolysiloxane there is present a hydrolyzed tetraalkoxysilane and/or an alkoxypolysiloxane to the extent of about 5 to 99 mole % of the silanes plus siloxanes, the solution further containing poly-lower alkylene oxide. The hydrolysis of the silanes or siloxanes is effected with at least the amount of water stoichiometrically required for complete hydrolysis of all the alkoxy groups of the silanes and siloxanes. The organoalkoxypolysiloxanes are themselves produced by partial hydrolysis of organoalkoxysilanes.

The silicone fibers so produced are predominantly silicon dioxide but include organic groups directly bonded to silicon, i.e., direct Si—C bonds and such bonded by carbon-oxygen-silicon bonds. By heating, the Si—C and Si—O—C bonds can be broken in whole or in part, yielding quartz fibers which, depending upon the manner of heating, may contain carbon in a finely disperse form.

As employed herein, the term "solution" also embraces the sol state.

The term poly-lower alkylene oxide, as employed in the present invention, comprises the polymerization products of ethylene oxide, propylene oxide and butylene oxide and their copolymers, especially the ethylene oxide-propylene oxide copolymer with less than about 50% propylene oxide. In the context of this specification, polyethylene oxide is used by way of example.

Both tetraalkoxysilanes (silicic acid tetraalkyl esters) and alkoxypolysiloxanes have been known for a long time. A customary method of manufacture of the alkoxypolysiloxanes is the partial hydrolysis of the tetraalkoxysilanes, which is usually catalytically accelerated by a small amount of added acid, in the presence of small amounts of alcohol as a solubilizing agent. The reaction of $SiCl_4$ and alcohol with the requisite amount of water is also frequently employed. Further methods of manufacture are given in, for example, "Chemie und Technologie der Silicone" ("Chemistry and Technology of the Silicones") by W. Noll, Verlag Chemie, Weinheim 1968, pages 559 – 563.

The alkoxypolysiloxanes obtained in accordance with the various methods can equally be used for the present process according to the invention. The tetraalkoxysilanes or alkoxypolysiloxanes are used in amounts of about 5 to 99, preferably of about 20 – 80, mole % (relative to the total silicon content of the spinning solution).

By organoalkoxysilanes there are to be understood, within the framework of the present invention, compounds which can be characterized by the following general formula:

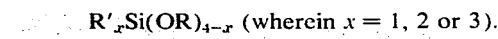
$R'_xSi(OR)_{4-x}$ (wherein $x = 1$, $2$ or $3$).

In the formula
R denotes a lower alkyl radical with one to four C atoms, such as, for example, methyl, ethyl, propyl and butyl;
R' denotes an alkyl radical with one to six C atoms, such as, for example, methyl, ethyl, propyl or butyl, or an alkenyl radical with two to six C atoms, such as, for example, vinyl or allyl, or an aryl radical with six to 10 C atoms, such as, for example, phenyl.

The compounds indicated by the formula have been described in the literature (loc. cit., 171 pp.).

Organoalkoxypolysiloxanes can be formed from these compounds by hydrolysis. Further details are given, for example, in "Chemie und Technologie der Silicone" ("Chemistry and Technology of the Silicones") by W. Noll, Verlag Chemie, Weinheim 1968.

The organo groups of the organoalkoxysilanes used can include saturated, unsaturated and aromatic hydrocarbon radicals. When using the compound types $R'_2Si(OR)_2$ and $R'_3Si(OR)$, it is also possible for different organic radicals to be bonded to one silicon atom. Furthermore, mixtures of various organoalkoxysilanes can be used. What has been said about the organoalkoxysilanes equally applies to organoalkoxypolysiloxanes. Within the framework of the present invention, compounds which contain aliphatic saturated and unsaturated hydrocarbon radicals with up to four C atoms, especially methyl, ethyl, vinyl and allyl groups, or aromatic hydrocarbon radicals, especially phenyl, are preferentially used.

As alkoxy groups, those from the series of the methoxy, ethoxy, propoxy and butoxy groups are used, individually or as mixtures. The methoxy and the ethoxy compounds are particularly preferred, that is to say broadly the following compounds: tetramethoxysilane, tetraethoxysilane, organotrimethoxysilane, organotriethoxysilane, diorganodimethoxysilane, diorganodiethoxysilane, triorganomethoxysilane and triorganoethoxysilane, or the polysiloxanes which are formally produced from these compounds in accordance with the following equations:

(a)

$p$ = degree of condensation, having a value of 2 to ∞, and $n$ can be between 0.5 and 2.

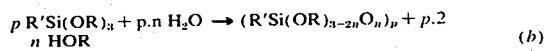

(b)

$n$ can be between 0.5 and 1.5.

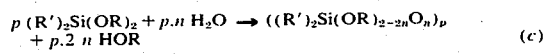

(c)

$n$ can be between 0.5 and 1.

Within the framework of the present application, the description "amount of water stoichiometrically required for complete hydrolysis" is to be understood as meaning that formally 1 mole of $H_2O$ replaces every 2 moles of alcohol. In fact, this is only imperfectly the case during the hydrolysis, since it is known that silanol groups occur in the hydrolysis products, in which case one molecule of $H_2O$ has replaced only 1 molecule of the alcohol. Furthermore Si—OR groups can still be present in the solutions which have been hydrolyzed with a distinct excess of water, as can be demonstrated, for example, by characteristic bands in the IR spectrum.

The minimum amount of water required for the hydrolysis depends on the particular silane; in detail, it is 2 moles of $H_2O$ per mole of silicon for tetraalkoxysilane 1.5 moles of $H_2O$ per mole of silicon for organotrialkoxysilane, 1 mole of $H_2O$ per mole of silicon for diorganodialkoxysilane and 0.5 mole of $H_2O$ per mole of silicon for triorganoalkoxysilane. If starting from polysiloxanes, the oxygen atoms already bonded in the molecule and each linking two silicon atoms have to be deducted in computing the amount of water required for the hydrolysis. To manufacture the spinning solutions according to the invention, up to six times the stoichiometrically required amount of $H_2O$ is generally used. Amounts which are between about 1.1 and 3 times the amount of water stoichiometrically required for complete hydrolysis of the alkoxy groups are particularly preferred. The hydrolyzed silane mixtures are remarkably stable, clear to slightly opalescent solutions. Their stability slowly decreases with increasing $H_2O$:Si ratio.

The alcohol generally added in small amounts as a solubilizing agent during the hydrolysis of the silane mixture is chosen from the group of the lower saturated aliphatic alcohols, preferably alkanols with 1 – 4 C atoms. Methanol and ethanol are particularly preferentially added as solubilizing agents. The alcohol which is used as the solubilizing agent does not have to be the same as the alcohol on which the alkoxy groups of the silanes employed are based. Appropriately, the amount of the alcohol added as a solubilizing agent will be kept low, for economic reasons. Typical concentration values are generally between about 10 and 40% in the spinning solution.

The known catalysts, especially strong acids, are generally added to the reaction solution for the hydrolysis of the Si—O—C bonds. Hydrochloric acid is particularly preferentially used. In general, minimal amounts, for example abaout 50 mg of HCl per mole of silicon, or even less, suffice.

The concentration of the silicon in the spinning solutions, expressed in per cent by weight of $SiO_2$, can be varied within wide limits, for example between about 5 and 40% of $SiO_2$. In general, concentrations between about 15 and 30% are preferred. The concentration of the polyethylene oxide is always substantially below the $SiO_2$ concentration of the spinning solution and depends greatly on the degree of polymerization of the polyethylene oxide. The concentration can be the lower, the higher is the degree of polymerization. Degrees of polymerization above about 5,000 are preferred and in order to keep the concentration of polyethylene oxide as low as possible, polyethylene oxide types with degrees of polymerization of about 100,000 or above are used. While a polyethylene oxide with a degree of polymerization of about 450, even at a concentration of 20%, does not give a spinnable solution with mixtures of the hydrolyzed silanes, spinnable solutions are very simply obtained with polyethylene oxides of higher degrees of polymerization, even at concentrations below about 2%. With polyethylene oxide of degrees of polymerization of about 100,000 or above, additions of less than about 0.5% down to 0.1% and even down to 0.01% already suffice to give outstandingly spinnable solutions.

The mixture of tetraalkoxysilane with the organoalkoxysilanes can be produced by using the appropriate compounds. Equally, the mixtures of alkoxypolysiloxane-organoalkoxysilane or tetraalkoxysilane-organoalkoxypolysiloxane or alkoxypolysiloxane-organoalkoxypolysiloxane can be obtained starting from the individual components. Within the framework of the present invention it is, however, preferred to produce the mixtures of tetraalkoxysilane-organoalkoxysilane or alkoxypolysiloxane-organoalkoxypolysiloxane from a mixture of the starting components in the desired ratio. For this purpose, for example, the corresponding easily available chlorosilanes ($SiCl_4$ and $R'SiCl_3$ and/or $(R')_2SiCl_2$ and/or $(R')_3SiCl$) can be reacted with the alcohol in a known manner. The complete removal of the hydrogen chloride liberated during the reaction, after the bulk thereof has been expelled by flushing with air or nitrogen, can be achieved by means of substances which have a basic reaction, such as, for example, ammonia or amines.

The manufacture of the spinning solution from a mixture prepared in accordance with any method and not itself possessing any spinnability is very simple. In detail, the following procedure can be employed: the silane mixture is hydrolyzed in a first step, for example by running the mixture of the silanes or polysiloxanes, simultaneously with the water, the solubilizing agent and the optionally used catalyst, into the reaction vessel while stirring. The exothermic hydrolysis reaction can be controlled very simply through the speed of addition. If appropriate the mixture can be additionally heated externally, especially in the case of polysiloxanes where the amount of heat liberated during hydrolysis is less. After completion of the hydrolysis, the mixture can be stirred for some time longer, 10 minutes to 2 hours generally sufficing. To hydrolyze the silane mixture it is, however, also possible intially to introduce water, solubilizing agent and catalyst into the reactor. The silane mixture is then allowed to run in while stirring, and heating if appropriate. It is, however, also possible first to introduce the silane and to allow the water/solubilizing agent/catalyst mixture to run in.

The solution of the hydrolyzed silanes manufactured by one of the procedures described above is then mixed, in a second step, with an aqueous solution of polyethylene oxide, and here a stirring time of 10 minutes to 2 hours in most cases suffices for homogenization. It is, however, also possible to add solid polyethylene oxide to the hydrolyzed silane mixture and to stir the mixture until it has completely dissolved, for which purpose one to 3 hours as a rule suffice. After filtration, the solution shows excellent spinnability.

Another method of manufacture, which is also very simple, again results in excellent behavior on spinning. For this, the silane mixture is treated with the solubilizing agent and the catalyst and is warmed to the reaction temperature, if necessary. The mixture is then directly hydrolyzed with the aqueous polyethylene oxide solution, while stirring. The concentration of the polyethylene oxide solution is so chosen that the spinning solution contains the requisite concentration of polyethylene oxide and the amount of water corresponds to the ratio desired for the hydrolysis. After stirring for a further short period, the spinning solutions can be used.

The viscosity of the spinning solutions according to the invention is very considerably lower than that of known spinning solutions such as are used, for example, for the manufacture of organic synthetic fibers. Typical values lie in the range of between 10 cP and a few P. They are therefore particularly easy to filter, simple to degas and easy to pump through feed lines.

If desired, substances suitable for crosslinking the organic groups can be added at any desired point during the manufacture of the solution. Small amounts of organic peroxides are preferentially used for this purpose, as is known from the technology of the silicone products. Organic peroxides which are suitable for crosslinking without application of pressure, such as, for example, tert.-butyl peroctoate, are particularly preferred. These crosslinking agents are particularly effective in the presence of unsaturated organic groups, for example the vinyl group. The action of the crosslinking agents only occurs during the manufacture of the fiber in the spinning column or during the subsequent heat treatment. As a result of the crosslinking which then takes place, the E-modulus of the fibers is increased (loc. cit., pages 197 – 198 and pages 336 – 338).

Possible spinning processes are wet spinning processes and dry spinning processes. In the case of the wet spinning process, the spinning solutions are spun into a suitable precipitation bath, where gelling of the filament occurs. Dry spinning to manufacture staple fibers can be carried out in a centrifugal spinning machine. The nozzle blowing process, in which the fibers issuing from nozzles are stretched by a strong stream of gas moving in the same direction is also suitable for staple fibers. Preferentially, the fibers can be manufactured in accordance with the conventional dry spinning process of the man-made fiber industry. In this case, the spinning solutions are spun, at room temperature or slightly elevated temperature, from a spinning head provided with a multiplicity of nozzles. The filaments pass through a heated spinning column through which air or nitrogen flows in the same direction as the filaments. At the end of the spinning column, the fibers are wound up on a drum. Fiber diameters between about 1 and 50 $\mu$m are obtainable by varying the take-off speed and also by varying the concentration and viscosity of the spinning solution. The fibers have round or elliptical to kidneyshaped cross-sections.

The white fibers obtained in this manner can be described as silicone fibers since they basically correspond to the definition for silicones (W. Noll: "Chemie und Technologie der Silicone" ("Chemistry and Technology of the Silicones"), Weinheim 1968, page 2). According to this, the description silicone is used for polymeric technical products which contain Si—O—Si bonds and hydrocarbon radicals directly bonded to the silicon. The silica gel fibers which are obtained by spinning a hydrolyzed tetraalkoxysilane differ from the silicone fibers obtained in accordance with the present process of the invention in that organic groups directly bonded to silicon are absent. The content of organic groups in the fibers is determined by the composition of the spinning solution, since all organic groups of the organoalkoxysilanes employed are contained in the silicone fiber. Additionally, a part of the Si—OR groups can still be present unchanged in the filament. The $SiO_2$ content of the silicone fibers depends on the proportion of organoalkoxysilanes or -polysiloxanes and on the nature of the organic groups in the spinning solution. It is particularly low if large organic groups, such as, for example, phenyl groups, are present in large numbers, and particularly high if only small amounts of methyltrialkoxysilane have been employed as the sole organoalkoxysilane. In general, the $SiO_2$ content of the silicone fibers is between about 70 and 80%, but it can also extend down to about 50%. After spinning, the silicone fibers are usually heated in air to temperatures of between about 200° and 600°C, in the course of which about 10 – 30% of volatile constituents are removed. The analysis of such a silicone fiber which was manufactured analogously to Example 2 hereinbelow and heated to 250°C, gave the following values: approximately 8% of carbon, approximately 3% of total hydrogen, approximately 2% of total water. The $SiO_2$ content was approximately 87%.

The silicone fibers manufactured according to the invention, in the freshly wound-up state, are already products which can be utilized in practice, since they display good tensile strengths. As particularly important properties of these novel fibers, their complete non-inflammability must be singled out, which together with their chemical resistance makes them industrially valuable novel products; for example, the silicone fibers can be converted into non-inflammable textiles.

By incorporating various organic groups into the silicone fibers it is possible to influence the E-modulus of the fibers. As the size of the organic groups increases, the E-modulus is displaced towards lower values. For most cases which occur in practice, the stability range of the silicone fibers extends up to about 600°C. On heating the fibers to about 600°C, the tensile strength of the fibers increases from approximately 20 to 30 kp/mm² to approximately 40 – 50 kp/mm² and at the same time the E-modulus increases, depending on the basic type of silicone, from between about 100 and 500 kp/mm² to about 500 to 2,000 kp/mm².

The silicone fibers according to the invention can be delimited from other fibers as follows: silicone fibers are fibers of diameter ranging from about 1 to 50 $\mu$, consisting of high-polymer, three-dimensionally cross-linked organopolysiloxanes containing about 50 to 99% of $SiO_2$, about 50 to 1% of organic groups, especially methyl, ethyl, vinyl, allyl and/or phenyl groups with a direct C—Si bond, about 20 to 0% of $H_2O$ and about 20 to 0% of alkoxy groups, especially methoxy and ethoxy groups.

On raising the temperature to above 600°C, the silicone fibers, if exposed to air, are ultimately converted into quartz glass fibers which do not differ from quartz fibers drawn from the melt either in respect of their tensile strength (about 100 kp/mm²) or in respect of their E-modulus (6,000 – 7,000 kp/mm²). Examination by X-rays shows a completely amorphous glass. The final temperatures which are needed for obotaining the quartz glass fibers, are between about 800° and 1,000°C, higher temperatures are possible because of the refractory properties of the fibers but are not necessary.

In order to obtain pure white quartz glass fibers, the rate of heating must not be chosen to be too high in the range in which the organic groups are split off, say between 650 and 800°C, since otherwise a part of the carbon is left in the fiber and colors the latter brown to black. As could be shown by chemical analysis a carbon content of about 1% by weight already imparts a black color to the fiber. However, the mechanical and other properties of the fibers are not adversely influenced by this discoloration. Both the pure white fibers and the dark-colored fibers can be used for reinforcing plastics, glasses, ceramic materials or metals and as high temperature insulating fibers. As a matter of fact, carbon contents of about 1% or higher, and preferably in excess of about 3%, are quite suitable for certain purposes in that they are substantially black and serve for imparting a black color to products in which they may be embedded.

If the heat treatment is carried out under a protective gas, for example nitrogen, instead of under air, the fiber again turns black. The amount of carbon which separates out is in this case however distinctly greater than in the case of rapid heating in air. Depending on the starting material, carbon contents of up to about 30% are obtainable. These fibers again are completely amorphous to X-rays. Because of their high strength and heat resistance the $SiO_2$ fibers containing carbon and manufactured under an inert gas are again suitable for use as both reinforcing fibers and insulating fibers.

The % data given in the present application relate to % by weight, unless otherwise stated.

The present invention is explained in more detail in the following illustrative examples.

EXAMPLE 1

300 g of ethanol were initially introduced into a round flask equipped with a reflux condenser and a mixture of 170 g of $SiCl_4$ and 50 g of $CH_3SiCl_3$ (molar ratio $SiCl_4$: $CH_3SiCl_3$ = 3:1) was added dropwise over the course of 40 minutes, at about 50°C, while stirring. Thereafter the mixture was boiled for 1 hour under reflux. After cooling, it was neutralized with $NH_3$ gas and the $NH_4Cl$ precipitate which had formed was separated off. 295 g of a clear, colorless, neutral filtrate were obtained, from which the excess alcohol was subsequently distilled off.

100 g of the silane mixture were treated with 20 g of methanol and 2 drops of concentrated hydrochloric acid and homogenized with 40 g of a 2% strength polyethylene oxide solution of degree of polymerization about 100,000, while stirring. After the reaction had started, which manifested itself by a rise in temperature, the mixture was stirred for a further 30 minutes at 50° – 55°C. The slightly opalescent solution was filtered through a G2 frit and was immediately of excellent spinnability. Its $SiO_2$ content was 22% and its polyethylene oxide content 0.5%.

The solution, at 25°C, was spun through a nozzle of 0.4 mm diameter and 10 mm length into a column which was heated to 200°C and flushed with dry air flowing in the same direction as the filaments. The fibers were wound up at the end of the column on a rotating drum, at a speed of 180 m/minute.

The fibers, which had a silky gloss, were heated overnight to 120°C and subsequently heated to 250°C in air, at a rate of heating of 50°C/hour. Thereafter the residue was 90.8%. Measurement of the tensile strength and of the E-modulus gave figures of 30 and 900 kp/mm², respectively. The fibers had a round cross-section and their diameter was 14 $\mu$m.

Further heating took place at 300°C/hour up to 1,000°C in a stream of air. Thereafter the fibers were immediately taken out of the hot oven. The residue (relative to freshly wound up fibers) amounted to 76.4%. The fibers were white and now had a diameter of 12 $\mu$m. The tensile strength was found to be 102 kp/mm² and the E-modulus 6,500 kp/mm². The fibers were amorphous to X-rays.

EXAMPLE 2

The same procedure as in Example 1 was used for the manufacture of the spinning solution. The following amounts of substance were used: 600 g of ethanol, 282 g of $SiCl_4$ and 250 g of $CH_3SiCl_3$ (molar ratio $SiCl_4$ : $CH_3SiCl_3$ = 1:1). 543 g of a clear, colorless, neutral silane mixture were obtained. Using the same conditions as in Example 1, 100 g of this mixture were converted into a spinning solution containing 21% of $SiO_2$ and 0.5% of polyethylene oxide, the solution was spun and the silicone fibers were heated to 1,000°C. The residue amounted to 77.5%. The fibers were white and had an elliptical cross-section, with a cross-sectional area of 220 $\mu m^2$. Their tensile strength was 100 kp/mm$^2$ and their E-modulus 6,000 kp/mm$^2$. The fibers were amorphous to X-rays.

A part of the fibers which had been dried up to 250°C, was heated at the same rate of heating, but with reduced access of air, in a quartz tube, in order to follow the decomposition of the organic constituents from their discoloration. In doing so, the fibers showed no change up to 650°C, at 700°C a slight yellow coloration became visible at some points, at 770°C the fibers were altogether light brown and at 1,000°C they were dark brown in color. Samples taken at various temperatures showed the following mechanical properties:

| Temperature, °C | Tensile strength kp/mm$^2$ | E-modulus kp/mm$^2$ |
| --- | --- | --- |
| 350 | 35 | 1,000 |
| 550 | 36 | 1,500 |
| 800 | 86 | 5,800 |

The dark brown fiber sample which had been heated to 1,000°C had a carbon content of 0.54%.

A further part of the fibers which had been pretreated up to 250°C was heated to 800°C under nitrogen, at a heating rate of 300°C/hour. Thereafter, the fibers were of a uniform black color. The tensile strength and E-modulus were measured on a sample taken, and found to be 78 kp/mm$^2$ and 4,500 kp/mm$^2$ respectively. The remaining fibers were heated to 1,200°C over the course of 4 hours. Their tensile strength was then 105 kp/mm$^2$ and their E-modulus 7,200 kp/mm$^2$. They contained 7.3% of carbon in a very finely divided form. No crystalline phase was detectable by X-ray methods.

If the fibers which had been freshly wound up, or the fibers which had been dried up to 250°C, are directly introduced into the non-luminous flame of a Bunsen burner, it can be seen that the fibers are non-inflammable and that they withstand the sudden temperature shock without detectable loss in strength.

EXAMPLE 3

To manufacture the spinning solution, the same procedure as in Example 1 was employed, using the following amounts of substance: 550 g of ethanol, 150 g of SiCl$_4$, 310 g of CH$_3$SiCl$_3$ (molar ratio SiCl$_4$ : CH$_3$SiCl$_3$ = 1:2.4). 464 g of clear, colorless, neutral silane mixture resulted, of which 100 g were converted, as described, into a slightly opalescent spinning solution containing 23% of SiO$_2$ and 0.5% of polyethylene oxide. The solution was spun as described, at 150 m/minute winding-up speed and was heated to 1,000°C analogously to Example 1. The fibers, which were brown in color due to inadequate aeration, had a kidney-shaped cross-section, the cross-sectional area being 125$\mu m^2$. Their tensile strength was found to be 60 kp/mm$^2$ and their E-modulus 6,300 kp/mm$^2$.

EXAMPLE 4

The spinning solution was manufactured as in Example 1, using the following amounts of substance: 320 g of ethanol, 250 g of SiCl$_4$, 63 g of (CH$_3$)$_2$SiCl$_2$ (molar ratio SiCl$_4$ : (CH$_3$)$_2$SiCl$_2$ = 3:1). 337 g of clear, colorless, neutral silane mixture resulted, of which 100 g were used for the manufacture of the spinning solution. In contrast to Example 1, the amount of methanol added as a solubilizing agent was in this case 15 g. The finished solution had an SiO$_2$ content of 20% and a polyethylene oxide content of 0.5%. Spinning was carried out as described, at a wind-up speed of 200 m/minute.

The very glossy fibers were heated for 2 hours to 120°C and subsequently, at a heating rate of 50°/hour, to 250°C, and thereafter their tensile strength was determined to be 30 kp/mm$^2$ and their E-modulus 1,000 kp/mm$^2$. The fibers had a slightly oval cross-section of 133 $\mu m^2$ cross-sectional area.

EXAMPLE 5

A spinning solution was produced under the same conditions as in Example 4, from the following substances: 320 g of ethanol, 170 g of SiCl$_4$, 75 g of CH$_3$SiCl$_3$, 45 g of (CH$_3$)$_2$SiCl$_2$ (molar ratio SiCl$_4$ : CH$_3$SiCl$_3$ : (CH$_3$)$_2$SiCl$_2$ = 2:1:1). 100 g of the 302 g of the clear, colorless, neutral silane mixture were used to prepare the spinning solution, containing 25% of SiO$_2$ and 0.5% of polyethylene oxide. The spinning solution was spun at 100 m/minute wind-up speed to give fibers, which were heated to 250°C as in Example 4. The fibers were then heated to 1,000°C over the course of one hour, in a strong stream of air. The resulting white fibers had an elliptical cross-section of cross-sectional area 165 $\mu m^2$. Their tensile strength was 73 kp/mm$^2$ and their E-modulus 6,000 kp/mm$^2$.

On rapidly introducing the fibers heated to 250°C, into a non-luminous Bunsen burner flame, the fibers showed no loss of mechanical properties. Burning phenomena were not detectable.

EXAMPLE 6

In contrast to the previous examples, the individual alkoxysilane components were in this case manufactured individually and mixed as such. To manufacture the spinning solution, 45 g of methyltriethoxysilane and 45 g of dimethoxydiethoxysilane (molar ratio 1:1) were mixed with 18 g of methanol and 0.18 ml of methanolic HCl solution, containing 13.5 mg of HCl, and subsequently, after warming to 30°C, the whole was homogenized with 36 g of a 2% strength aqueous polyethylene oxide solution (according to Example 1), while stirring. After the hydrolysis reaction, which takes place with evolution of heat, the mixture was stirred for a further 30 minutes without external heating. The solution, of excellent spinnability, contained 21% of SiO$_2$ and 0.5% of polyethylene oxide. Spinning was carried out as in Example 1, with a take-off speed of 150 m/minute. Glossy, white non-inflammable fibers of good strength were obtained.

The alkoxysilane components were manufactured as follows: 2 moles of CH$_3$SiCl$_3$ were added dropwise to 6 moles of ethanol. Thereafter the mixture was boiled for 2 hours under reflux, in the course of which the bulk of the HCl was removed. The elimination of HCl was completed by passing NH$_3$ gas over the mixture at room temperature. After filtering off the NH$_4$Cl, the neutral filtrate was fractionated and the main fraction at 141° – 146°C (760 mm Hg) was employed as methyltriethoxysilane.

2 moles of SiCl$_4$ were added dropwise to a mixture of 4 moles of methanol and 4 moles of ethanol and thereafter the whole was boiled for 1 hour under reflux. The reaction was completed by passing in $NH_3$ gas at room temperature. After filtration, the filtrate was employed as dimethoxydiethoxysilane.

EXAMPLE 7

A spinning solution containing 23% of $SiO_2$ and 0.5% of polyethylene oxide was prepared, as described in Example 6, from 54 g of dimethoxydiethoxysilane, 42 g of dimethyltetraethoxydisiloxane (molar ratio $Si(OCH_3)_2(OC_2H_5)_2$ : $1/2$ $CH_3(OC_2H_5)_2—Si—O—SiCH_3(OC_2H_5)_2 = 1:1$), 20 g of methanol, 0.2 ml of a methanolic HCl solution containing 15 mg of HCl and 40 g of 2% strength polyethylene oxide solution, and was spun, in the same manner, to give white, glossy fibers of good strength.

To manufacture dimethyltetraethoxydisiloxane, 300 g of $CH_3SiCl_3$ and a mixture of 184 g of ethanol and 18 g of water was simultaneously introduced dropwise into a flask heated to 50°C. Thereafter the mixture was boiled for 1 hour under reflux. The reaction was completed by passing in $NH_3$ gas at room temperature. After filtering off the $NH_4Cl$ formed, the filtrate was directly used for the manufacture of the silane mixture.

EXAMPLE 8

A completely clear solution of excellent spinnability, containing 21% of $SiO_2$ and 0.5% of polyethylene oxide, was prepared from 43 g of hexaethoxydisiloxane, 45 g of methyltriethoxysilane (molar ratio $1/2$ $(C_2H_5O)_3Si—O—Si(OC_2H_5)_3$ : $CH_3Si(OC_2H_5)_3 = 1:1$), 18 g of methanol, 0.18 ml of methanolic HCl solution containing 13.5 mg of HCl and 35 g of 2% strength polyethylene oxide solution, as described in Example 6, and was spun in the same manner to give glossy, white fibers of good strength.

The hexaethoxydisiloxane was manufactured in an analogous manner to the manufacture of dimethyltetraethoxydisiloxane in Example 7.

EXAMPLE 9

The procedure in this example was entirely analogous to Example 1. The following substances were used for the manufacture of the silane mixture: 350 g of ethanol, 170 g of $SiCl_4$, 93 g of $CH_3SiCl_3$, 80 g of $(CH_3)_2SiCl_2$ and 27 g of $(CH_3)_3SiCl$ (molar ratio $SiCl_4$ : $CH_3SiCl_3$ : $(CH_3)_2SiCl_2$ : $(CH_3)_3SiCl = 1.6:1:1:0.4$). 372 g of a neutral silane mixture were obtained, of which 100 g were used for the manufacture of the spinning solution containing 21% of $SiO_2$ and 0.5% of polyethylene oxide. The fibers which were wound up at a take-off speed of 150 m/minute, showed good strength. On boiling with strong hydrochloric acid, the freshly wound-up fibers were not damaged. On introducing the fibers into the non-luminous flame of a Bunsen burner, no burning phenomena were observed; the strength of the fibers was not impaired by this treatment.

EXAMPLE 10

330 g of ethanol were first introduced into a round flask equipped with a reflux condenser, and a mixture of 170 g of $SiCl_4$, 135 g of $CH_3SiCl_3$ and 16.1 g of $CH_2:CHSiCl_3$ (50 mole % of $SiCl_4$, 45 mole % of $CH_3SiCl_3$ and 5 % of $CH_2:CHSiCl_3$) was added dropwise over the course of 1 hour at 30°C, while stirring. Thereafter the mixture was boiled for 1 hour under reflux. After cooling, the reaction mixture was neutralized with $NH_3$ gas and small amounts of $NH_4Cl$ precipitate which had formed were separated off. 363 g of a clear, neutral filtrate resulted.

100 g of the silane mixture were treated with 20 g of methanol and 0.2 ml of methanolic HCl solution containing 15 mg of HCl, and the whole was warmed to 35°C and homogenized with 40 g of a 2% strength aqueous solution of polyethylene oxide of degree of polymerization about 100,000, while stirring. In the course thereof, the alkoxy groups were hydrolyzed, and this manifested itself in a temperature rise. After the hydrolysis, the solution was cooled to ambient temperature over the course of 30 minutes, while continuing to stir. The clear solution was filtered through a G 2 frit and immediately possessed excellent spinnability. Its $SiO_2$ content was 19% and its polyethylene oxide content 0.5%.

The solution, at 25°C, was spun through a nozzle of 0.4 mm diameter and 10 mm length into a column which was heated to 175°C and flushed with dry air moving in the same direction as the filaments. At the end of the column the fibers were wound up on a rotating drum at a speed of 170 m/minute.

The white fibers which had a silky gloss, were heated for 1 hour to 100°C and subsequently heated in air to 250°C at a heating rate of 50°C/hour; thereafter the residue (relative to the freshly wound-up fibers) was 88.5%. The fibers had a diameter of 23 $\mu$m, their tensile strength was 25 kp/mm$^2$ and their E-modulus was 500 kp/mm$^2$.

Thereafter the fibers were heated to 500°C in a stream of air, at a rate of heating of 100°C/hour. After this, the total weight loss (relative to the freshly wound-up fibers) was now 22.8%. The tensile strength had risen to 48 kp/mm$^2$ and the E-modulus to 1,700 kp/mm$^2$. The external appearance of the fibers was unchanged.

If the fibers heated to 250°C, are directly introduced into the non-luminous flame of a Bunsen burner, no burning phenomena arise. Thereafter, the fibers are black in color. The fibers withstand the sudden temperature shock without detectable loss in strength.

EXAMPLE 11

The procedure of Example 10 was followed in order to convert a mixture of 170 g of $SiCl_4$, 105 g of $CH_3SiCl_3$ and 48.2 g of $CH_2:CHSiCl_3$ (50 mole% of $SiCl_4$, 35 mole% of $CH_3SiCl_3$ and 15 mole% of $CH_2:CHSiCl_3$) into the corresponding ethoxy compounds. The further conversion to give the spinning solution, the manufacture of the fibers and the subsequent heat treatment were also carried out as in Example 10. After heating to 250°C the fibers showed the same strength data as the corresponding fibers in Example 10, and after heating to 500°C a E-modulus of 1,200 kp/mm$^2$, and the same tensile strength as in Example 10, were measured.

A part of the fibers which had been heated to 500°C was heated to 1,000°C at a heating rate of 230°C/hour in a stream of air. Thereafter, the fibers were an unchanged white and had a tensile strength of 86 kp/mm$^2$ and a E-modulus of 7,000 kp/mm$^2$. The total weight loss (relative to the freshly wound-up fibers) was 28.4%. A part of the fibers, heated to 250°C, was heated in a stream of nitrogen to 500°C at a heating rate of 100°C/hour and to 1,000°C at a heating rate of 230°C/hour. The fibers, which were black in color due to carbon separating out, had a tensile strength of 90 kp/mm² and a E-modulus of 6,900 kp/mm².

X-ray examination of the fibers heated to 1,000°C either in air or under nitrogen showed no crystalline structure whatsoever.

EXAMPLE 12

An analogous mixture of ethoxysilanes to that mentioned in Example 11 was converted into a spinning solution in accordance with the method indicated in Example 10 and spun into fibers, but additionally, after the hydrolysis and homogenization, 0.64 g of tert.-butyl peroctoate were added to the solution together with the polyethylene oxide solution. After heating to 500°C, carried out as in Example 10, the E-modulus was 1,700 kp/mm² and thus noticeably increased compared to the fibers of Example 11. The tensile strength was measured to be 50 kp/mm².

EXAMPLE 13 AND 14

These examples show the manufacture of silicone fibers containing phenyl groups. They were manufactured in accordance with the method described in Example 10. Ethoxysilane mixtures were manufactured starting from the following chlorosilanes, in the quantity ratio indicated:

|  | Example 13 | Example 14 |
|---|---|---|
| SiCl₄ (g) | 170 | 170 |
| CH₃SiCl₃ (g) | 135 | 105 |
| C₆H₅SiCl₃ (g) | 22 | 67 |
| SiCl₄ (mole %) | 50 | 50 |
| CH₃SiCl₃ (mole %) | 45 | 35 |
| C₆H₅SiCl₃ (mole %) | 5 | 15 |

The corresponding silicone fibers, which were heated to 500°C as indicated in Example 10, showed the following properties:

|  | Example 13 | Example 14 |
|---|---|---|
| weight loss (%) (relative to the freshly wound-up fibers) | 15 | 18 |
| color | white | yellowish |
| diameter (μm) | 16 | 18 |
| tensile strength (kp/mm²) | 22 | 20 |
| E-modulus (kp/mm²) | 1,100 | 800 |

The fibers from Example 14, which had been heated to 500°C, were heated to 1,000°C in a stream of air, at a heating rate of 230°C/hour. Thereafter the fibers were white. The total weight loss was 36.3%. Measurement of the tensile strength and of the E-modulus showed 106 kp/mm² and 7,200 kp/mm² respectively.

A part of the fresh silicone fibers from Example 14 was heated in a stream of nitrogen to 500°C at a heating rate of 100°C/hour and to 1,000°C at a heating rate of 230°C/hour. Thereafter the fibers were colored black by carbon. The analytical determination of the carbon content showed 16.1%. The total weight loss was 27.0%. The tensile strength of the fibers was determined to be 100 kp/mm² and their E-modulus 6,700 kp/mm².

It will be appreciated that the instant specification and example are set forth by way of illustration and not limitation, and that various modifications and changes may be made without departing from the spirit and scope of the present invention.

What is claimed is:

1. The process for the production of fibers containing silicon-oxygen bonds comprising dry spinning a solution comprising poly-lower alkylene oxide and the reaction product of at least one of a tetraalkoxysilane and alkoxypolysiloxane, at least one of an organoalkoxysilane and an organoalkoxypolysiloxane, and at least the amount of water stoichiometrically required for complete hydrolysis of all the alkoxy groups of the silanes and siloxanes, the tetraalkoxysilane plus alkoxypolysiloxane being present to the extent of about 5 to 99 mole % of the silanes plus siloxanes, the poly-lower alkylene oxide having a degree of polymerization above about 5,000 and being present in the spinning solution in a concentration of about 0.01 to 2% by weight, whereby there is produced a fiber containing silicon-oxygen bonds and some silicon-carbon bonds.

2. A process according to claim 1, wherein the poly-lower alkylene oxide is polyethylene oxide.

3. Process according to claim 1, wherein the tetraalkoxysilane plus alkoxypolysiloxane are present to the extent of about 20 to 80 mole % of the silanes plus siloxanes.

4. Process according to claim 1, wherein the spinning solution contains up to about 40% by weight of a lower saturated aliphatic alcohol.

5. Process according to claim 1, wherein the spinning solution has a SiO₂ content of about 5 to 40% by weight.

6. Process according to claim 1, including the further step of heating the spun fiber to a temperature of between about 200°C and 600°C to increase their mechanical stability.

7. Process according to claim 1, including the further step of heating the spun fiber to a temperature in excess of about 600°C to about 1,000°C thereby to break silicon-carbon bonds and form a quartz fiber.

8. Process according to claim 4, wherein heating is effected rapidly or under an inert gas, thereby leaving carbon particles dispersed in the quartz.

9. Process according to claim 1, wherein the spinning solution is produced by contacting silicon tetrachloride with an organosiliconchloride and a lower alkanol to produce at least one of a tetraalkoxysilane and an alkoxypolysiloxane and at least one of an organoalkoxysilane and an organoalkoxypolysiloxane, removing by-product HCl, thereafter adding water in about one to six times the stoichiometric amount required for complete hydrolysis of all the alkoxy groups of the silanes and siloxanes, and adding polyethylene oxide having a degree of polymerization above about 5,000 to a concentration of about 0.01 to 2% by weight of the solution.

10. Process according to claim 9, wherein the organosiliconchloride has the formula

wherein

R' is an alkyl or alkenyl radical with up to six carbon atoms or an aryl radical with six to 10 carbon atoms, and x is an integer from 1 to 3, the water is added in about 1.1 to 3 times the stoichiometric amount required for complete hydrolysis of all the alkoxy groups of the silanes and siloxanes, the polyethylene oxide having a degree of polymerization of about 100,000 and being present in a concentration of about 0.1 to 0.5% by weight, the tetraalkoxysilane plus alkoxypolysiloxane being present to the extent of about 20 to 80 mole % of the silanes plus siloxanes, the solution having a SiO$_2$ content of about 15 to 30% by weight and a lower alkanol content of about 10 to 40% by weight, the solution being dry spun and the resulting silicone fiber being heated above about 600°C to about 1000°C to form a quartz fiber.

* * * * *

UNITED STATES PATENT OFFICE
CERTIFICATE OF CORRECTION

Patent No. 3,907,954　　　　　　　　　　Dated September 23, 1975

Inventor(s) Manfred Mansmann

It is certified that error appears in the above-identified patent and that said Letters Patent are hereby corrected as shown below:

The term of this patent subsequent to June 28, 1991, has been disclaimed.

Signed and Sealed this

Thirteenth Day of July 1976

[SEAL]

Attest:

RUTH C. MASON
*Attesting Officer*

C. MARSHALL DANN
*Commissioner of Patents and Trademarks*